July 11, 1939.   F. A. G. PIRWITZ   2,165,574
PHOTOGRAPHIC SHUTTER
Filed Jan. 14, 1938   8 Sheets-Sheet 1

INVENTOR.
Friedrich A. Gustav Pirwitz
BY Harold E. Stonebraker
his ATTORNEY.

July 11, 1939.　　F. A. G. PIRWITZ　　2,165,574
PHOTOGRAPHIC SHUTTER
Filed Jan. 14, 1938　　8 Sheets-Sheet 2

INVENTOR.
Friedrich A. Gustav Pirwitz
BY Harold E. Stonebraker
his ATTORNEY.

July 11, 1939.   F. A. G. PIRWITZ   2,165,574
PHOTOGRAPHIC SHUTTER
Filed Jan. 14, 1938   8 Sheets-Sheet 3

INVENTOR.
Friedrich A. Guslav Pirwitz
BY Harold E. Stonebraker
his ATTORNEY.

July 11, 1939.  F. A. G. PIRWITZ  2,165,574
PHOTOGRAPHIC SHUTTER
Filed Jan. 14, 1938  8 Sheets-Sheet 4

INVENTOR.
Friedrich A. Gustav Pirwitz
BY Harold E. Stonebraker
his ATTORNEY.

July 11, 1939.  F. A. G. PIRWITZ  2,165,574
PHOTOGRAPHIC SHUTTER
Filed Jan. 14, 1938  8 Sheets-Sheet 5

July 11, 1939.  F. A. G. PIRWITZ  2,165,574
PHOTOGRAPHIC SHUTTER
Filed Jan. 14, 1938    8 Sheets-Sheet 6

INVENTOR.
Friedrich A. Gustav Pirwitz
BY Harold E. Stonebraker
his ATTORNEY.

INVENTOR.
Friedrich A. Gustav Pirwitz
BY Harold E. Stonebraker
his ATTORNEY.

Patented July 11, 1939

2,165,574

UNITED STATES PATENT OFFICE 2,165,574

PHOTOGRAPHIC SHUTTER

Friedrich A. Gustav Pirwitz, Rochester, N. Y., assignor to Wollensak Optical Company, Rochester, N. Y., a corporation of New York Application January 14, 1938, Serial No. 185,023

20 Claims. (Cl. 95—63)

This invention relates to a photographic shutter, and while its features are susceptible of various applications, it is intended more particularly for a high speed shutter of the set type, in which a master operating member is put under tension by a setting lever, and when released effects operation of the shutter at the speed for which adjustment has been made, and it has for its principal purpose to afford a mechanism having a minimum number of parts of light weight and compactly arranged, so as to make possible both accurate and high speed operations.

Another purpose of the invention is to afford a structure in which shutter blades of the lightest and thinnest material can be successfully employed, securing accuracy of operation at high speed exposures, such as $\frac{1}{100}$ and $\frac{1}{200}$ part of a second, and at the same time avoiding excessive or fast wear of the shutter parts.

An additional object of the invention is to afford an operating mechanism so designed as to permit the utilization of a light weight shutter blade operating ring of aluminum or other suitable light weight alloy.

A further purpose of the invention is to afford an accurate, dependable and durable shutter that can be built at a low cost, bringing it within the range of general commercial use, while attaining the same degree of speed that has heretofore been possible only with heavier and more costly constructions.

In a more particular aspect, the invention has for its object to afford a shutter, preferably of the set type, which includes a single control member or trigger that is adjustably positionable to bring about operation of the shutter for either a time, bulb, or an instantaneous exposure at any selected speed within the limitations of the adjustment, as for instance from $\frac{1}{2}$ to $\frac{1}{200}$ part of a second, the control member or trigger being adjustable to cooperate with the master operating member from any selected position to give the desired exposure.

Another purpose of the invention is to provide a shutter with a single trigger that is practical in design and will cooperate with a master operating member in any of several different positions so that when released, it will effect the necessary movements of the master operating member for either bulb, time or instantaneous exposures.

A further purpose of the invention is to afford a simple and efficient type of retarding mechanism that is operatively associated with the master operating member and so designed that the gear ratio is automatically changed at certain higher speeds to reduce the resistance of the retarding mechanism, and at the same time make possible accurate operation of the shutter at such high speeds.

Another purpose of the invention is to afford a retarding mechanism, the action of which is additionally modified at certain speeds by an escapement pallet that is automatically disengaged from the retarding mechanism at certain predetermined points.

An additional object of the invention is to afford a simple and efficient controlling cam that is adjustable and serves to govern simultaneously the positions of the trigger, the retarding mechanism, the escapement pallet, and a supplemental means for imposing additional tension on the master operating member to effect a high speed of instantaneous exposure when the retarding mechanism is entirely disengaged.

Still a further object of the invention is to afford a simple and practical construction for housing and supporting the various parts referred to including the shutter blades and blade operating ring, and correlating these various parts in compact relation, affording a light weight compact assembly that can be manufactured at a relatively low cost.

To these and other ends, the invention consists in the arrangement and construction of parts that will appear clearly from the following description when read in conjunction with the accompanying drawings, the novel features being pointed out in the claims following the specification.

The structure shown is intended only as illustrative of one possible embodiment of the invention, and not in any sense as limiting the invention to any particular details. Referring more particularly to the drawings in which similar reference numerals refer to the same parts throughout the several views, and to Figs. 1 to 6, 1 designates the bottom wall of the housing or casing, 2 is the side wall, and 3 is the top wall which is secured to the housing by the several screws 4. The top wall includes a collar or upstanding portion 5, and is provided with an arcuate slot 6 for a purpose that will appear presently, while 7 designates the adjustable controlling cam for determining the position of the several parts, depending upon the selection of a time, bulb, or instantaneous exposure and the speed of the latter.

Figure 1:
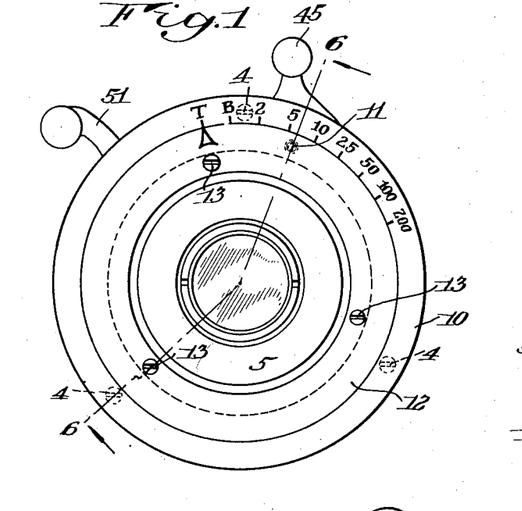
Fig. 1 is a plan view of a photographic shutter constructed in accordance with one embodiment of the invention.
Figure 2:
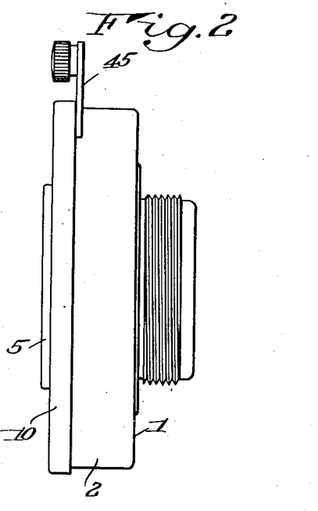
Fig. 2 is a side elevation of the same.
Figures 3, 4:
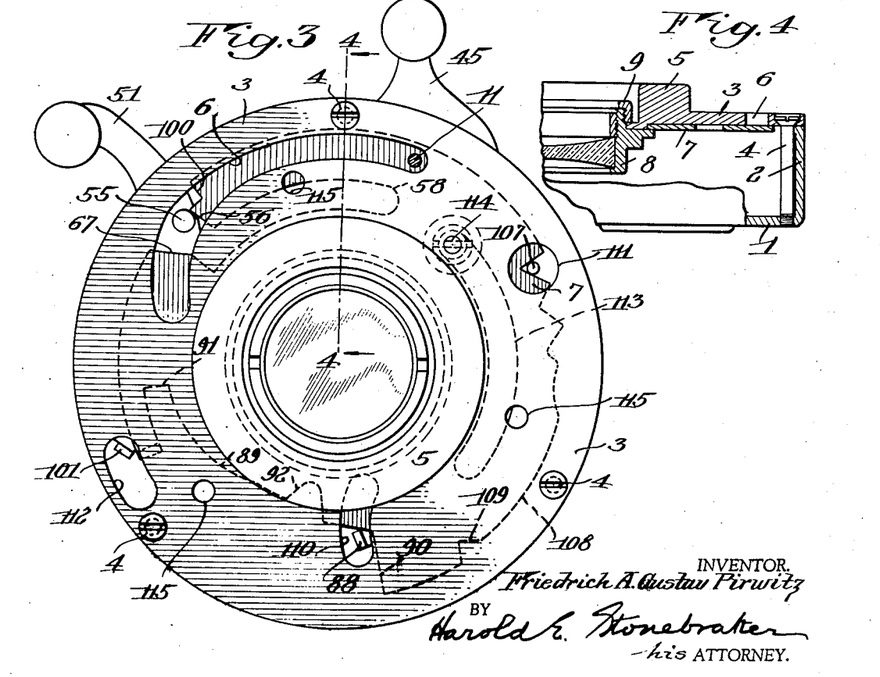
Fig. 3 is an enlarged view similar to Fig. 1 with the cover plate and adjusting ring removed, and showing the controlling cam partially in dotted lines and in the position of adjustment that it occupies when holding the control member or trigger and other parts at the proper places for a time exposure.
Fig. 4 is a transverse sectional view on the line 4—4 of Fig. 3.
Figure 6:
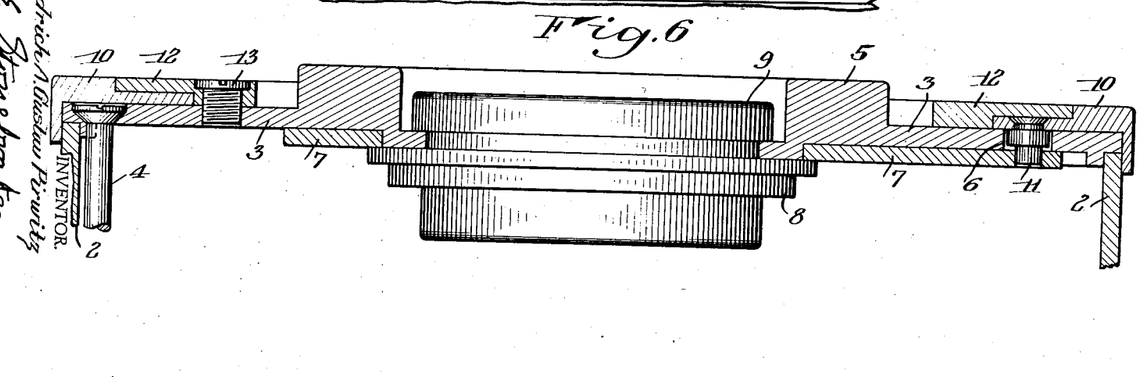
Fig. 6 is a similarly enlarged transverse sectional view on the line 6—6 of Fig. 1.
Figures 7, 8, 9, 10, 11:
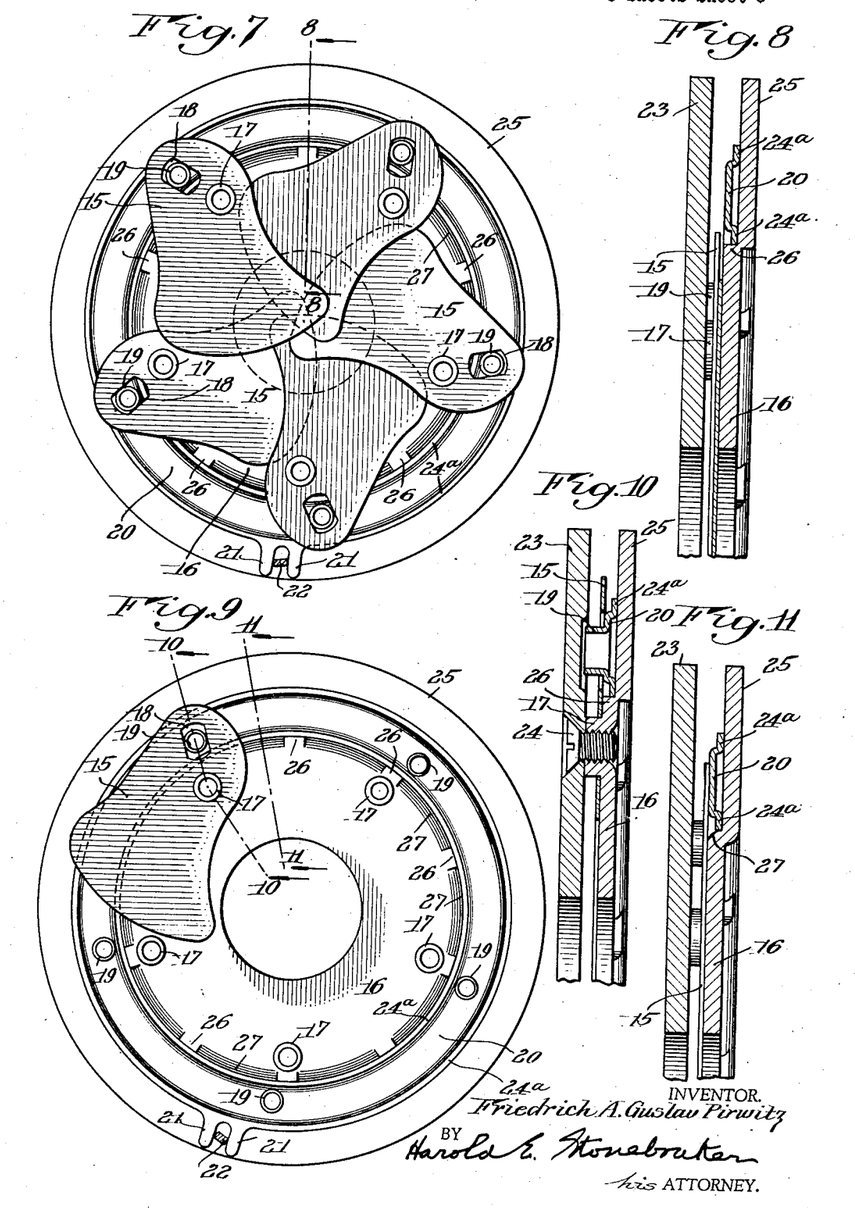
Fig. 7 is a plan view of the shutter blade assembly, including the blade operating ring and their support, with the actuating device appearing in section, and the mechanism thereabove removed.
Fig. 8 is a transverse sectional view on line 8—8 of Fig. 7.
Fig. 9 is a view similar to Fig. 7, showing one of the shutter blades in its retracted position.
Fig. 10 is a detail transverse sectional view on the line 10—10 of Fig. 9.
Fig. 11 is a detail transverse sectional view on the line 11—11 of Fig. 9.

The controlling cam 7 is seated against the under surface of the top wall 3, see Figs. 4 and 6, and is held in place by a flange on the lens barrel 8 which is secured in the opening in the center of the housing and held in place by the usual attaching ring 9. 10 designates an adjusting ring that carries fixed thereto a depending pin 11, see Figs. 3 and 6, which latter is movable in the aforementioned arcuate slot 6, and engages an opening in the controlling cam 7 so that when the adjusting ring 10 is turned on the housing, the adjusting cam 7 is similarly moved. The adjusting ring 10 carries the indicia shown in Fig. 1, which cooperate with an indication on a stationary cover plate 12 which overlies a reduced portion of the adjusting ring 10, as shown in Fig. 6, and is held in place on the top of the housing by the screws 13.

Referring to Figs. 5 to 11, the exposure opening is normally closed by a series of overlapping shutter blades 15 which may be made of hard rubber, duraluminum, or other suitable extremely light weight material. The blades 15 rest on the central portion 16 of a base that is secured to the bottom of the housing in any convenient way. The central portion 16 of the base is provided with a series of studs 17, each of which engages a circular opening in one of the blades and serves as a pivotal point for the latter.

At its outer end, each blade is provided with an elongated opening 18 that receives a stud or projection 19, preferably formed integral with the blade operating ring 20 which is provided with the forked members 21 between which engages arm 22 depending from the actuating device or lever that will be described presently and which is moved back and forth to effect the desired shutter blade operations.

The shutter blades move between the base just described and the surmounting plate 23 that is held in place on the central portion 16 by means of screws 24 engaging threaded openings in the aforementioned studs 17.

The blade operating ring 20 that is oscillated to effect movement of the shutter blades is made of duraluminum or other suitable light weight and very thin material, and in order to reduce the friction between the operating ring and its engaging surfaces, its central portion is upset and provided with depending marginal portions 24ª that rest upon the outer part 25 of the base, the latter being offset from the central portion 16. The central portion 16 of the base is formed with lugs or upstanding bearing portions 26 of reduced width at intervals around its periphery to afford surfaces against which the operating ring contacts and by which it is guided, and between the lugs 26, the central portion 16 is rounded off or cut away as at 27, see Fig. 11, to reduce to a minimum the frictional engagement between the operating ring and the supporting base.

It is to be understood that these parts are considerably exaggerated in the drawings, and that the metal of which the operating ring is formed is made as thin and light as possible in order to facilitate its movement and to permit the use of thin, light weight shutter blades of hard rubber or other suitable material, without excessive wear on the latter, and to enable accurate operations at high speeds. The general arrangement of the shutter housing and blades having been described, the mechanism will now be set forth by which the depending portion 22 of the actuating device is moved back and forth, to effect the desired shutter operations.

Figures 12, 13, 14, 15:
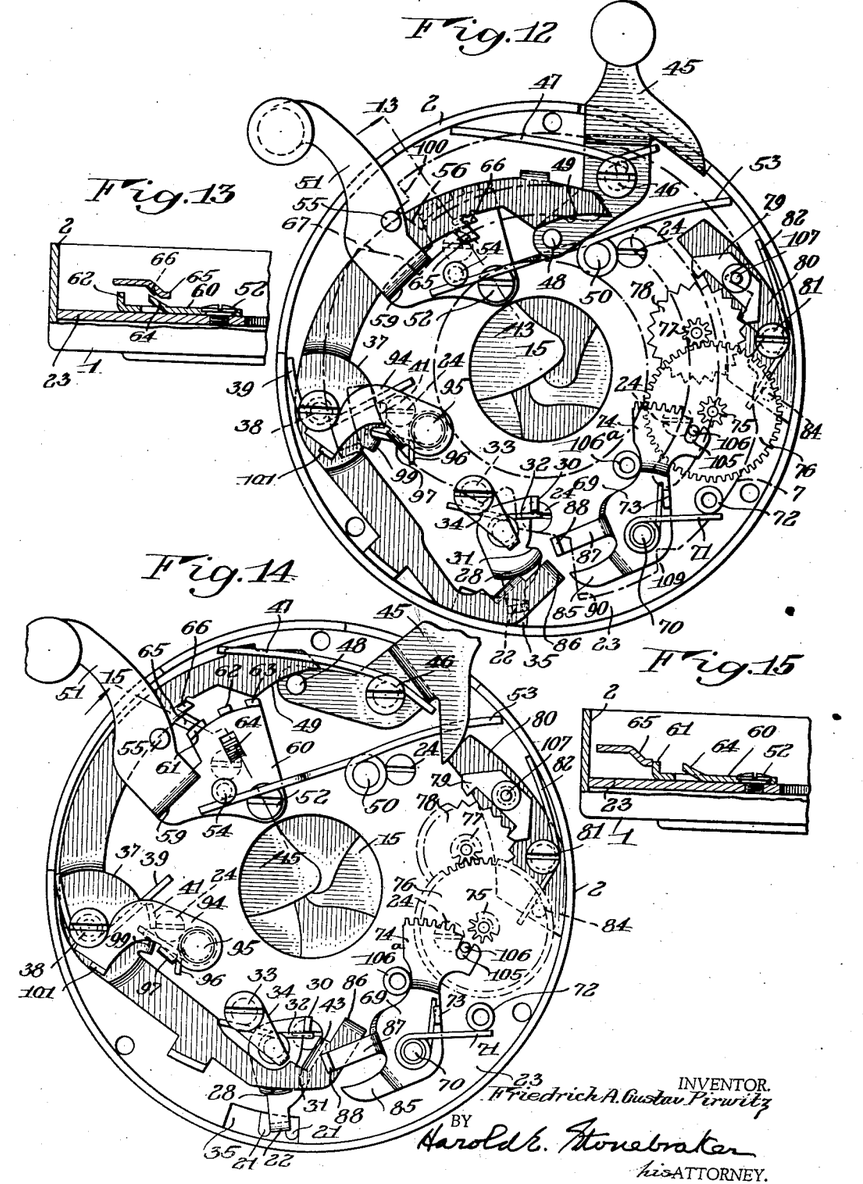
Fig. 12 is a plan view similar to Fig. 3 with the top of the housing removed, the controlling cam being indicated in dotted lines, and showing the normal position of the parts with the shutter closed, the master operating member released, and the trigger adjusted to the position required for a time exposure.
Fig. 13 is a detail transverse sectional view on the line 13—13 of Fig. 12 illustrating the relation between the trigger and master operating member when the latter is in normal or released position and the trigger adjusted for a time exposure.
Fig. 14 is a plan view similar to Fig. 12, showing the setting lever in the position which it assumes when it has moved the master operating member to its set or tensioned position for a time exposure, where it is held by the trigger.
Fig. 15 is a detail transverse sectional view on line 15—15 of Fig. 14, illustrating the relation between the trigger and master operating member when the latter is set for a time exposure.
Figures 31, 32:
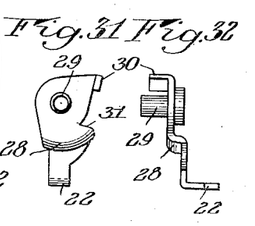
Fig. 31 is a detail plan view of the actuating device which is connected to and moves the shutter blade operating ring.
Fig. 32 is a side elevation of the same.

The mechanism now to be described is mounted on the plate 23, and referring to Figs. 5, 12, 22, 31 and 32, the depending portion 22 is part of an actuating device or lever that includes a cam surface 28, a stud 29, an upstanding lug 30, and a shoulder 31, see Figs. 12 and 31, that is engaged to effect the required movemnt of the actuating device. Said actuating device is pivotally supported on a post to turn about the center of the stud 29 as an axis, and is held in its normal position illustrated in Fig. 12 by a coil spring 32 surrounding said stud 29 and having one end engaging the lug 30 and its other end engaging a fixed post 33 secured to the plate 23, while 34 is a cover plate secured to the post 33 and acting to hold the actuating device and spring 32 assembled in operative position.

The depending portion or arm 22 of the actuating device travels in a slot 35 in the plate 23, the end of said slot limiting the movement of the arm 22, as shown in Fig. 12. The actuating device is moved from the position shown in Fig. 12 by a master operating member that is set or put under tension by a setting lever, and then released by a control member or trigger to effect any desired exposure, and the construction and arrangement of the master operating member will now be described.

Figure 27:
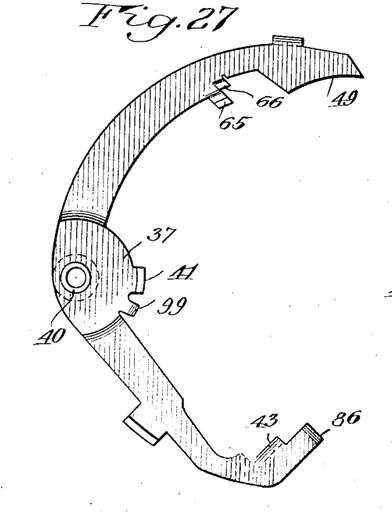
Fig. 27 is a detail plan view of the master operating member.
Figures 28, 29, 30:
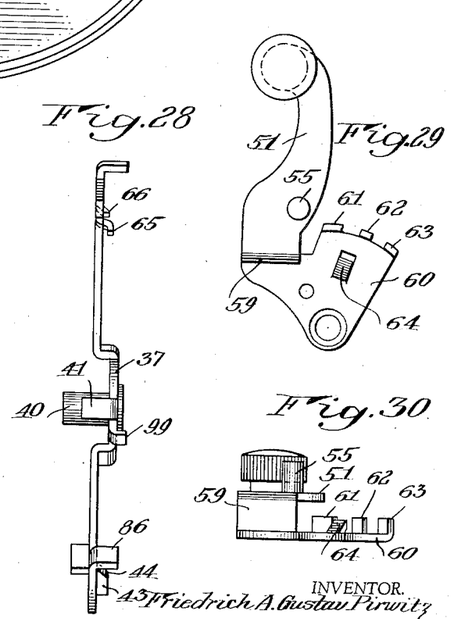
Fig. 28 is a side elevation of the same.
Fig. 29 is a detail plan view of the control member or trigger.
Fig. 30 is an end elevation of the same.

The master operating member is shown in detail in Figs. 27 and 28, and includes a generally U-shaped lever embodying a central portion 37 that is pivoted on the post 38, see Fig. 12. 39 is a coil spring surrounding the sleeve 40 of the master operating member and having one end embracing the lug 41 and its opposite end embracing the side wall of the housing, as shown in Fig. 12, thereby acting to hold the master operating member normally in the position shown in Fig. 12 with its one end resting against the side wall of the housing.

The master operating member carries a depending lug 43, see Fig. 28, one end of which has a beveled surface 44 that is adapted to ride up over the cam surface 28 on the actuating device to permit the opposite end of said lug 43 to drop down behind the shoulder 31 of the actuating device. This movement of the lug 43 from the position shown in Fig. 12 to the position shown in Fig. 14, for instance, takes place when the master operating member is set or put under tension, as will be described hereinafter. During such setting of the master operating member, when it is shifted from the position shown in Fig. 12 to that shown in Fig. 14, a certain amount of lateral movement is permitted, due to its inherent spring character so as to permit the lug 43 to ride over the aforementioned cam surface 28 and to drop behind the shoulder 31, as shown in Fig. 14, the master operating member being then in position to effect movement of the actuating device when released by the operation of the trigger, that will be described presently.

Figures 16, 17:
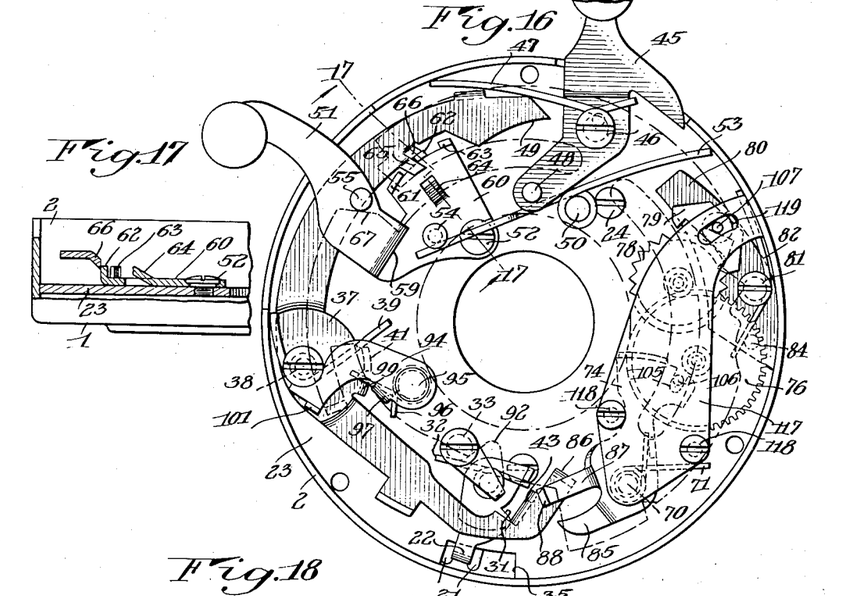
Fig. 16 is a view similar to Figs. 12 and 14, showing the position the parts assume upon operating the trigger in one direction from the position of Fig. 14 and before release of the trigger.
Fig. 17 is a detail transverse sectional view on the line 17—17 of Fig. 16, showing the relation between the trigger and master operating member when the latter has been partially released upon initial movement of the trigger.
Figure 18:
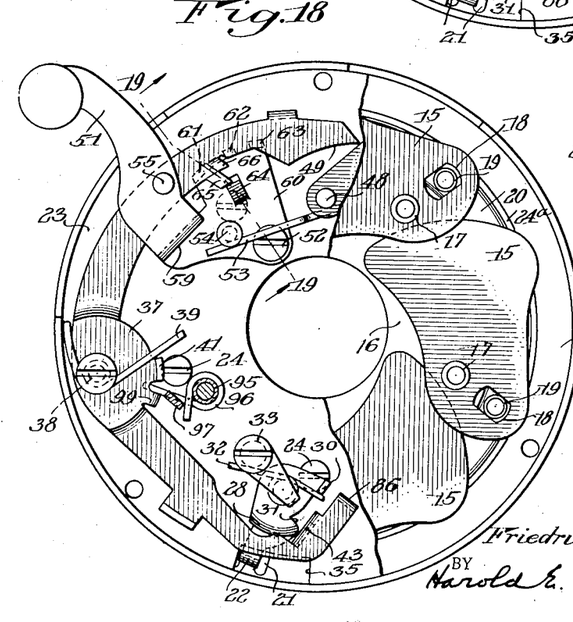
Fig. 18 is a view similar to Fig. 16, showing the position assumed by the parts after the trigger has been released and assumes its initial position, holding the master operating member in position to retain the shutter open until the trigger is again operated, according to the usual time exposure operation.
Figure 19:
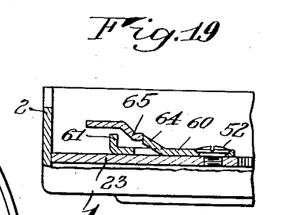
Fig. 19 is a detail transverse sectional view on the line 19—19 of Fig. 18 showing the relation between the trigger and the master operating member when the latter is retained by the released trigger so as to hold the shutter open for a time exposure, and until a second operation of the trigger.

When the master operating member is released from its set position illustrated in Fig. 14, the spring 39 actuates it toward the position shown in Fig. 12, and in the course of such movement, the lug 43 which is in engagement with the shoulder 31, swings the actuating device about its pivot, causing the depending arm or projection 22 to move from the position shown in Fig. 12 to that shown in Figs. 16 and 18, in which position the lug 43 has disengaged the shoulder 31 but is holding the actuating device by contact with the outer edge of the shoulder portion, as shown, and further movement of the master operating member toward normal position releases the actuating device, whereupon the spring 32 restores it to its initial position and thus closes the shutter.

The master operating member is put under tension by a setting lever 45 which is pivoted on a post 46 and held in normal position by a spring 47 coiled about said post and having one end engaging the setting lever and its opposite end engaging the side wall 2 of the housing, see Fig. 12. The setting lever carries a pin 48 arranged to engage a curved surface 49 on the adjacent end of the master operating member so that when the setting lever is moved by the operator from the position shown in Fig. 12 to that shown in Fig. 14, the adjacent end of the master operating member is moved outwardly to swing it about its pivot 38 and to move the opposite end inwardly into operative relation with the actuating device, as previously described. When released, the setting lever 45 is restored to its initial position by the spring 47, with its lower end resting against the post 50.

The master operating member is held in its set position by a control member or trigger 51 that is pivoted to swing about a post 52 and is actuated toward its normal position by a spring 53 mounted on the post 50 and having one end engaging a stop 54 on the trigger and its opposite end engaging the side wall 2 of the housing, see Fig. 12.

Figures 20, 21, 22:
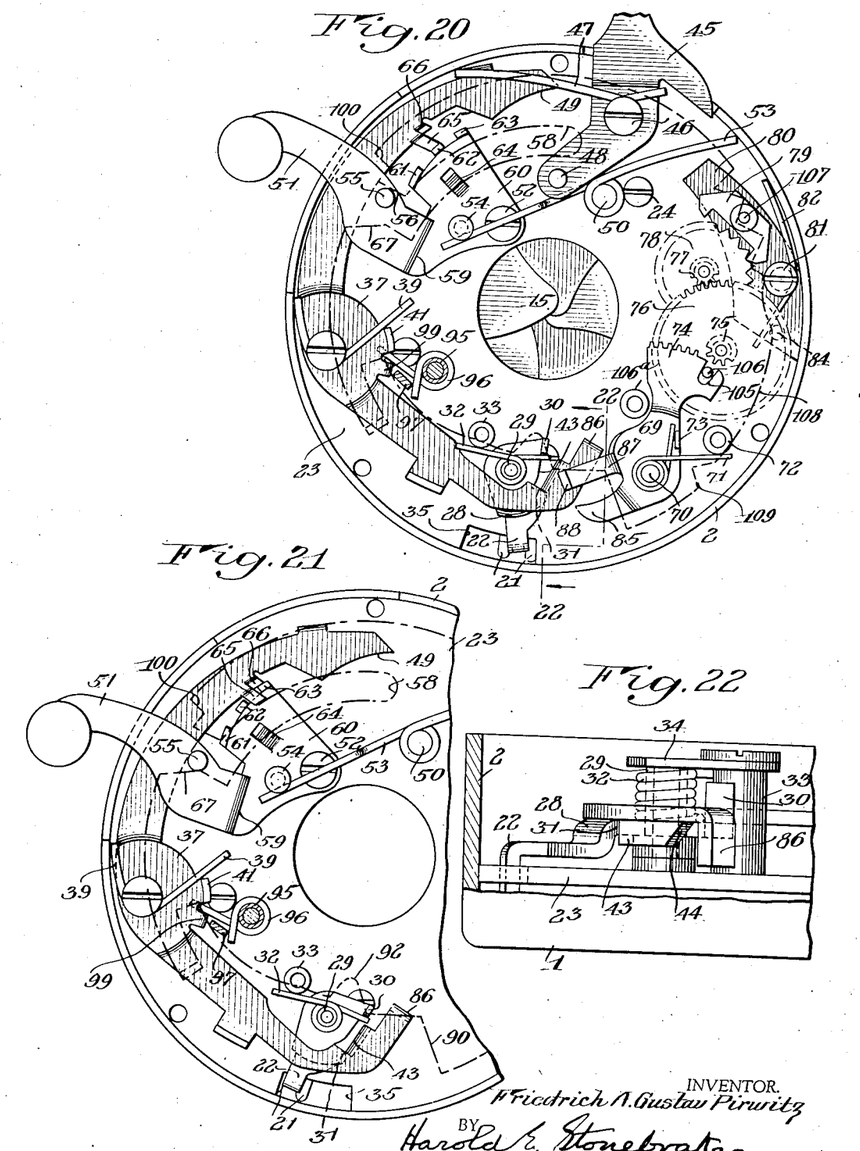
Fig. 20 is a view similar to Fig. 14, with the master operating member in set position, and the trigger adjusted in proper position to effect a bulb exposure.
Fig. 21 is a view similar to Fig. 20, partially broken away, and showing the position of the parts after the trigger has been moved in one direction to permit partial release of the master operating member for a bulb exposure and before release of the trigger and return thereof to its normal position.
Fig. 22 is an enlarged transverse sectional view on the line 22—22 of Fig. 20.
Figure 23:
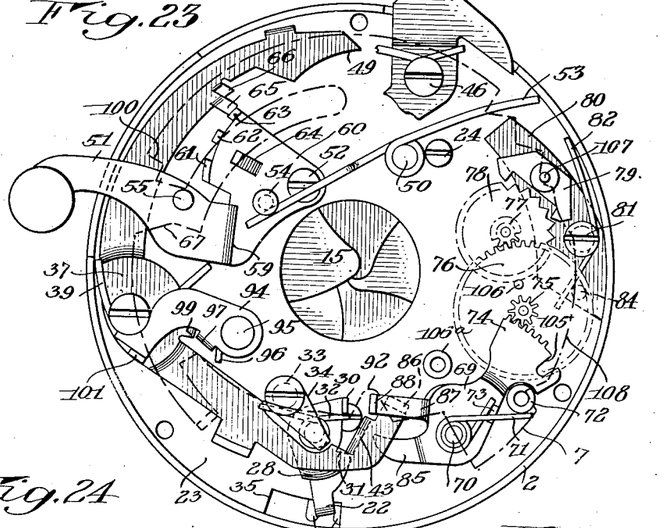
Fig. 23 is a view similar to Fig. 14, with the trigger adjusted to the proper position to effect an instantaneous exposure, and the retarding mechanism adjusted to permit an exposure of ½ second.
Figure 24:
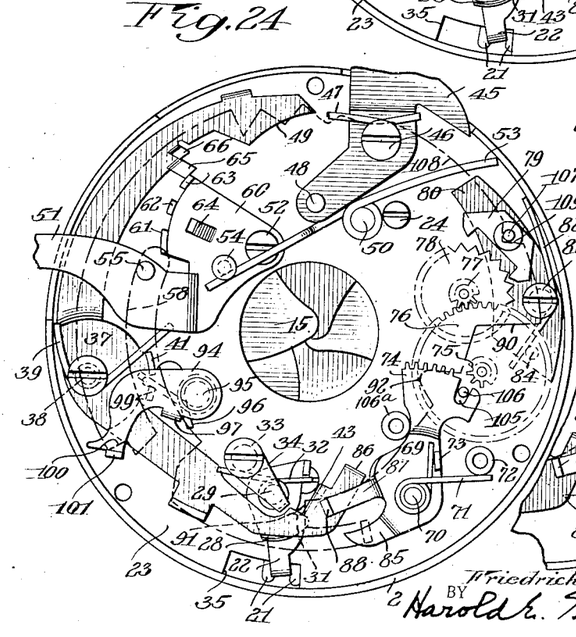
Fig. 24 is a view similar to Fig. 23 showing the trigger and master operating member in the same relative positions, and the retarding mechanism and supplemental tensioning member adjusted for an instantaneous exposure of 1/200 second.
Figure 26:
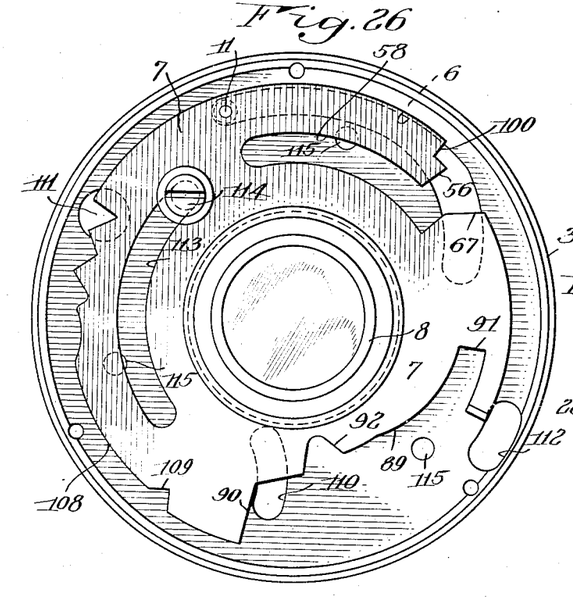
Fig. 26 is a bottom plan view of the controlling cam and the top of the housing by which it is supported.

The control member or trigger 51 is movable about its pivot 52 to the several positions illustrated in Figs. 12 to 18 for controlling a time exposure, the positions illustrated in Figs. 20 and 21 for controlling a bulb exposure, and the positions illustrated in Figs. 23 and 24 for controlling an instantaneous exposure of any selected speed, and in order to adjust the trigger to any of its several initial positions, it is provided with a stop 55, see Fig. 12, which engages the adjacent edge 56 of the aforementioned controlling cam 7, said cam being cut away and slotted at 58, see Fig. 26.

It will be understood that the trigger 51 is located beneath the controlling cam 7 and that the stop 55 projects upwardly into the path of the slot at 58 so that when the controlling cam 7 is adjusted by turning the adjusting ring 16, see Fig. 6, the surface 56 on the cam and the slot 58 cooperate to move the stop 55 and with it the trigger 51 from the position illustrated in Figs. 3 and 12 to 18 for controlling a time exposure to the position illustrated in Figs. 20 and 21 for controlling a bulb exposure, or to the position shown in Figs. 23 and 24 for controlling instantaneous exposures, the extreme position of the trigger in this direction being illustrated in Fig. 24 where the projection 55 is close to the end of the slot 58.

It will be understood that in any of the positions of the controlling cam just described, the initial position of the trigger is selectively determined by the engagement of the stop 55 with the adjacent surface of the cam against which it abuts, the trigger being actuated against the cam by the aforementioned spring 53. Thus by adjusting the controlling cam, the single control member or trigger can be adjustably positioned to effect varied movements of the master operating member, depending upon the particular kind of exposure selected. The construction of the trigger and master operating member by which such cooperation between these parts is effected will now be described.

Referring to Figs. 14 and 29, the trigger 51 includes an outer portion overlying the master operating member, and an inwardly extending portion 59 connecting with an extension plate 60 provided at its outer edge with three spaced laterally extending projections or controlling stops 61, 62 and 63, while 64 designates a supplemental stop struck out from the extension plate 60 and located between the outer stops and the pivotal axis of the trigger, as shown in Figs. 14 and 29. The master operating member is provided with fingers 65 and 66 formed and located as shown in Figs. 14, 27 and 28 at varying distances from the outer periphery of the master operating member, and arranged to pass alternately between the stops 61, 62 and 63, and over the extension plate 60.

With the trigger set by the controlling cam for a time exposure, as shown in Figs. 12 and 14, when the master operating member is tensioned by actuating the setting lever 45, the finger 65 on the master operating member wipes over the stops or projections 64 and 61 on the trigger in moving from the position shown in Fig. 12 to that shown in Fig. 14. In the latter position, the finger 65 drops behind the projection or stop 61 on the trigger, the spring or elasticity of the master operating member being sufficient to permit this lateral movement and locking action.

With these parts in the position shown in Fig. 14, the setting lever having returned to its initial position, the trigger is adjusted for a time exposure and the master operating member is set and held by the trigger.

When the trigger is operated from the position shown in Figs. 12 and 14 to that shown in Fig. 16, such movement of the trigger being limited by the stop 55 engaging the surface 57 on the controlling cam, the stop 61 on the trigger is moved out of engagement with the finger 65 on the master operating member, permitting the latter to move inwardly as shown in Fig. 16, until finger 66 engages the stop or projection 62. When the trigger is released and moves back to its initial position of Fig. 14, stop or projection 62 is moved away from engagement with the finger 66, permitting the master operating member to move inwardly further until finger 65 engages the supplemental stop 64, as shown in Fig. 18. This movement of the master operating member is permitted since the latter is located in a plane slightly above stops 61, 62 and 63, and since the finger 65 is bent laterally, the stop 61 moves to one side of the finger 65 when travelling from the position shown in Fig. 16 to that illustrated in Fig. 18.

This movement of the master operating member is sufficient to move the actuating device to the position illustrated in Fig. 18, the shutter blade operating ring having been thereby moved far enough to open the shutter which is retained open until the trigger is again operated, whereupon the stop or projection 64 is moved away from engagement with the finger 65 on the master operating member and the latter is free to move to its normal position, releasing the actuating device and permitting the latter to restore the shutter blades to closed position.

When a bulb exposure is to be made, the controlling cam already described is adjusted circularly by turning the adjusting ring 16, see Fig. 6, causing the trigger 51 to be shifted to the position illustrated in Figs. 20 and 21. With the trigger adjusted to the position just referred to, when the master operating member is tensioned by the setting lever in the manner already described, the finger 65 engages the middle controlling stop 62 on the trigger, see Fig. 20. When the trigger is operated from this position, the stop 62 moves away from finger 65 and the latter is free to move between stops 62 and 63 inwardly, as shown in Fig. 21, until finger 66 engages the stop 63. This permits movement of the master operating member far enough to open the shutter in the manner already described, and the shutter is thus held open as long as the trigger is held in the position shown in Fig. 21. Upon release of the trigger from this position, the stop 63 is moved away from engagement with the finger 66, and the finger 66 being free to move inwardly between the stops 62 and 63, the master operating member is thus permitted to be restored to its normal position by its spring, thus releasing the actuating device and permitting the shutter to be closed.

When an instantaneous exposure at any desired speed is required, the trigger is adjusted to the position shown in Figs. 23 and 24 by the controlling cam 7 already referred to, and while in this position, when the master operating member is tensioned by the setting lever already described, the finger 65 engages the controlling stop 63, shown in Figs. 23 and 24. When the trigger is actuated, stop 63 is moved away from engagement with the finger 65, freeing the latter and permitting the master operating member to move at once to its normal position at whatever speed has been selected, depending upon the relation of the retarding mechanism and supplemental tensioning means which are governed by the controlling cam in a manner that will now be described more fully.

Referring to Fig. 12, the retarding mechanism includes a train of gearing comprising a plate 69 pivoted on the post 70 and held in its normal or initial position, illustrated in Fig. 23, by a spring 71 mounted on the post 70 with one end engaging a post 72 and its opposite end engaging a lug 73 carried on the plate 69. The plate 69 has formed as a part thereof a gear segment 74 that engages a pinion 75 mounted on the same shaft with and adjacent to a gear 76. The gear 76 engages a pinion 77 mounted on the same shaft with an escapement wheel 78 which is engaged by an escapement pallet 79 that is pivoted upon a plate 80, the latter in turn being pivoted upon a post 81 and held in its operative position, as shown in Fig. 12, by a spring 82 which surrounds the post 81 and has one end in engagement with a pin 84 on said plate 80, while the other end of said spring engages the side of the housing.

Figure 5:
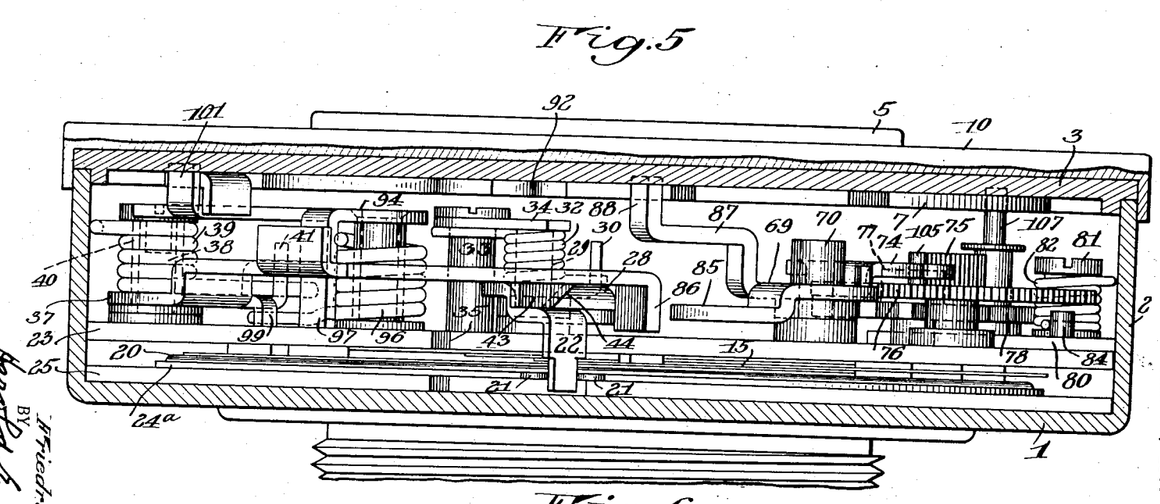
Fig. 5 is a further enlarged transverse sectional view through the housing, showing the interior operating mechanism in side elevation, looking from the bottom of Fig. 3 upwardly.

The plate 69 of the retarding mechanism is provided with an operating portion 85, see Figs. 5 and 12, while the master operating member has a depending lug 86 that drops behind the operating portion 85 in the manner shown in Fig. 23, riding over the latter due to the action of the aforementioned cam surface 28 on the actuating device, see Fig. 22, when the master operating member is tensioned upon operating the setting lever. With the parts in the position shown in Fig. 23, when the master operating member is released for an instantaneous exposure, the depending lug 86 will engage the operating portion 85 of the retarding mechanism and the speed of operation of the shutter is restrained by the retarding mechanism until the master operating member has moved sufficiently far to disengage the operating portion 85 on the plate 69 which is thereupon returned to its initial adjusted position.

The extent to which the movement of the master operating member is restrained by the retarding mechanism is determined by the position of the latter which is adjustable for different speeds, from ½ second to ¹⁄₁₀₀ part of a second for instance, and to accomplish this, the plate 69 is provided with an arm 87, see Figs. 5 and 12, having an upstanding portion or extension 88 which engages the surface 89 of the controlling cam, see Fig. 26, at some point between the radial portions 90 and 91 of the cam. As the controlling cam is rotated, as previously described through the operation of the adjusting ring 10, the upstanding portion 88 on the plate 69 of the retarding mechanism is moved inwardly or outwardly to vary the restraining action of the retarding mechanism.

In the position shown in Figs. 3, 12, 14 and 20, the upstanding portion 88 is held in its extreme outward position so as to render the retarding mechanism inoperative during a time or bulb exposure. When the adjusting ring is turned for an exposure of ½ second, as in Fig. 23, the controlling cam is rotated until the notch 92 is opposite the portion 88, permitting the latter to move inwardly as far as it will go, as shown in Fig. 23, and thus imposing full action of the retarding mechanism for a ½ second exposure. For higher speed instantaneous exposures, the adjusting ring and cam are turned further, moving the upstanding projection 88 outwardly to a corresponding extent until these parts reach the position illustrated in Fig. 24, when the retarding mechanism is rendered inoperative for an exposure of maximum speed of ¹⁄₂₀₀ of a second.

At maximum speed, it is desirable to impose additional power on the master operating member, and in order to effect this, a supplemental tensioning means is provided through the instrumentality of a plate 94, see Fig. 24, pivoted on a post 95 around which is arranged a coil spring 96 having one edge engaging a lug 97 on the plate and its opposite end engaging a lug 99 on the master operating member, see Fig. 12. The plate 94 just described normally occupies the position shown in Fig. 12 against the post 38, and when moved away, as shown in Fig. 24, it puts the spring 96 under tension and thereby imposes additional spring tension on the master operating member, tending to return the latter to its initial position at greater speed. The plate 94 is moved to the position illustrated in Fig. 24 to impose such supplemental tensioning action on the master operating member by the aforementioned cam 7 which has a portion 100, see Fig. 3, that engages the lug 101 on the plate 94, moving the supplemental tensioning member to the required position for a high speed operation.

It is also desirable to further lessen the effect of the retarding mechanism at exposures of ¹⁄₅₀ to ¹⁄₁₀₀ of a second, and this result can be accomplished in the following manner. At one end of the gear segment 74, see Fig. 12, there is provided a slot or recess 105 that is engageable with a pin 106 carried upon the side of the gear 76. The pin 106 being further removed from the center of the pinion 75 than are the teeth of gear segment 74 causes a change in the speed ratio between gear segment 74 and gear 76, reducing the resistance offered by the retarding mechanism. The recess 105 and pin 106 engage each other and come into play after disengagement of the gear segment 74 and pinion 75, as these parts move from the position illustrated in Fig. 23, the normal or initial position, to that illustrated in Fig. 12, which is the extreme position in the other direction, these movements of the gear segment being determined by the posts 72 and 106.

Figure 25:
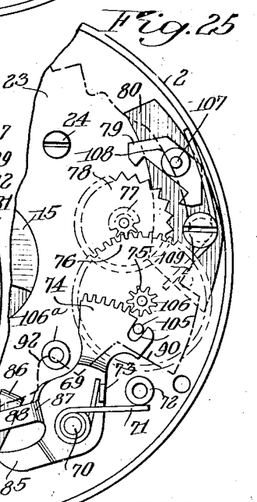
Fig. 25 is a detail plan view, with parts broken away, of the retarding mechanism, showing the position of the escapement pallet when disengaged from the retarding mechanism for operation of the shutter at a speed of 1/50 second.

When the parts are positioned as shown in Fig. 23, the upstanding portion 88 of the retarding mechanism has moved inwardly into the recess 92 of the controlling cam, the latter having been adjusted to the position for a ½ second exposure, in which the maximum retarding action for an instantaneous exposure is effective. When the controlling cam is adjusted to the position for a ¹⁄₅₀ second exposure or ¹⁄₁₀₀ second exposure, upstanding portion 88 of the plate 69 is moved outwardly by the controlling cam to the position illustrated in Fig. 25, in which position the pin 106 is engaged with the recess 105 so that when the portion 85 of the plate 69 is engaged by the depending lug 86 of the master operating member, the movement of the master operating member will be retarded only to the extent of the additional travel of pin 106 engaged with the recess 105.

At the same time, and also at certain other speeds, such as ¹⁄₁₀ of a second and ¹⁄₂₅ of a second, it is desirable to move the escapement pawl 79 out of operative engagement with escapement wheel 78, and to accomplish this there is extended upwardly from the pivoted plate 80, which carries the escapement pallet 79, a pin 107 which is also engaged by the controlling cam 7. The latter is provided with a surface 108 that moves the pin 107 outwardly far enough to disengage the pallet 79 from the escapement wheel 78 when the cam is adjusted to effect instantaneous exposures at speeds from 1/10 of a second to 1/100 of a second. When the controlling cam is adjusted to a speed of 1/200 of a second, as shown in Fig. 24, the pin 107 drops into a notch 109 of the cam for the purpose of facilitating accurately positioning the controlling cam. The escapement pallet is reengaged with the escapement wheel at this point of adjustment, but this does not affect the speed of operation because the retarding mechanism has been entirely disengaged through the movement of the upstanding portion 88 outwardly to its extreme outer position through engagement with the adjacent surface of the controlling cam, as shown in Fig. 12. The controlling cam also has notches formed therein and engageable with the pin 107 to facilitate positioning the controlling cam accurately for speeds of 1/2 second, also for the bulb and time exposure positions.

The inward and outward movements of the portion 88 which governs the position of the retarding mechanism are permitted by a slot 110 in the top 3 of the housing, see Figs. 3 and 26, while the necessary inward and outward movements of the pin 107 governing the escapement pallet are permitted by the opening 111 in the top 3, see Figs. 3 and 26. 112 is an opening in said top 3 which permits the arcuate movement of the lug 101 on the supplemental spring tensioning plate 94, and adjustment of the controlling cam in opposite directions is limited by the slot 113, see Fig. 26, which engages a stop screw 114 passing through said slot and secured to the top 3 of the housing on its under side, see Fig. 3. The openings 115 appearing in Fig. 3 in the top 3 of the housing receive the screws 13 previously described and shown in Fig. 6, which secure in place the cover plate 12.

Referring to Fig. 16, 117 designates a cover plate secured to the posts by screws 118 and acting to overlie and hold in position the various parts of the retarding mechanism as shown, said plate being provided with a slot 119 which receives and permits the necessary inward and outward movements of the pin 107.

The operation of the structure briefly is as follows: With the adjusting ring in the position shown in Fig. 1 for a time exposure, the controlling cam and trigger are in the position shown in Figs. 3 and 12, and the retarding mechanism is rendered ineffective in this position, the upwardly extending portion 88 of plate 69 having been moved to its outermost position by the adjacent engaging surface of the controlling cam. With the parts in this position, the master operating member is set by moving the setting lever to the position shown in Fig. 14, and when the setting lever is released, it returns to the position shown in Fig. 12 and the master operating member is held in its set position by the trigger, as shown in Fig. 14. When the trigger is moved downwardly with reference to Fig. 14, to the position shown in Fig. 16, the master operating member is partially released and moves far enough to open the shutter, and when the trigger is released, it holds the master operating member in the position shown in Fig. 18, with the shutter actuating device still in position to hold the shutter open. The parts remain in this position until a second operation of the trigger, upon which the parts are restored to the initial position of Fig. 12.

For a bulb exposure, the adjusting ring and controlling cam are turned until the latter is in the position indicated in Fig. 20, the retarding mechanism being held out of operative relation by the cam, while the position of the trigger has been changed to bring the center controlling stop 62 into operative position. When the master operating member is set, the parts assume the position shown in Fig. 20, and upon moving the trigger downwardly with reference to Fig. 20, the master operating member moves a sufficient distance to move the shutter actuating device to open the shutter which is held open as long as the trigger remains in the position of Fig. 21. When the trigger is released, the master operating member assumes its initial position and the shutter actuating device is restored and the shutter closed.

For an instantaneous exposure of 1/2 second, the adjusting ring and controlling cam are moved to the position illustrated in Fig. 23, in which case the trigger is adjusted so that its controlling stop 63 will cooperate with the master operating member when the latter is set, and at the same time, the controlling cam has permitted the retarding mechanism and escapement pallet to be moved to the necessary positions for imposing their maximum effect so that when the trigger is moved downwardly with reference to Fig. 23, the master operating member is released and immediately assumes its initial position, subject to the full action of the retarding mechanism and escapement pallet. For any instantaneous exposure, the trigger is retained in this same adjusted position by the controlling cam.

For speeds of 1/5, 1/10 and 1/25 of a second, the retarding mechanism is adjusted by the controlling cam to offer correspondingly less resistance to the action of the master operating member, and for speeds of 1/10 and 1/25 of a second, the escapement pallet is disengaged by the controlling cam in the manner already described. At speeds of 1/50 and 1/100 of a second, the effect of the retarding mechanism depends only upon the pin and notch engagement, the pinion and segment which are engaged at lower speeds have been rendered ineffective at these speeds, and at a speed of 1/200 second, the retarding mechanism is moved by the controlling cam to a position where it is ineffective, and the speed of the master operating member is increased by the supplemental spring tensioning device already referred to which is moved to the position shown in Fig. 24 by the controlling cam.

While the parts have been described herein with reference to certain specific structure, the invention is not confined to the combinations or details shown, and this application is intended to cover any adaptations or modifications of the invention that may come within the intent of the improvement or the scope of the following claims.

I claim:

1. In a photographic shutter, the combination with a master operating member that is operable to effect movement of the shutter for a time, bulb, or instantaneous exposure, of a one-piece trigger, cooperating means between the master operating member and trigger comprising a plurality of integral fingers on one of said elements and a series of integral stops on the other of said elements, said stops cooperating selectively with one of the fingers and the other of said fingers cooperating with one of the stops during time or bulb exposures, and means engageable with the trigger for adjusting and retaining it in selected initial position.

2. In a photographic shutter, the combination with a master operating member that is operable to effect movement of the shutter for a time, bulb, or instantaneous exposure, and a setting lever operatively associated with the master operating member, a plurality of fingers on the master operating member, of a one-piece trigger provided with a series of integral controlling stops which are selectively engageable with one of said fingers on the master operating member to retain the latter and control its movement for either time, bulb, or instantaneous exposure, the other of said fingers on the master operating member cooperating with a stop on the trigger during the time or bulb exposures, and means engageable with the trigger for adjusting it in selected initial position.

3. In a photographic shutter, the combination with a master operating member that is operable to effect movement of the shutter for a time, bulb, or instantaneous exposure, and a setting lever operatively associated with the master operating member, a plurality of fingers on the master operating member, of a one-piece trigger provided with a series of integral controlling stops spaced from each other and arranged at equal distances from the point about which the trigger moves, said stops being selectively engageable with one of said fingers and cooperating with the other of said fingers to retain the master operating member after it has been partially released upon movement of the trigger in one direction and acting to release the master operating member for completion of its movement when the trigger is returned to its initial position for effecting a bulb exposure, and means engageable with the trigger for adjusting it in selected initial position.

4. In a photographic shutter, the combination with a master operating member that is operable to effect movement of the shutter for a time, bulb, or instantaneous exposure, and a setting lever operatively associated with the master operating member, a pair of fingers spaced outwardly one from the other on the master operating member, of a one-piece trigger provided with three integral controlling stops spaced from each other and arranged at equal distances from the point about which the trigger moves, said stops being selectively engageable with one of said fingers, and a supplemental integral controlling stop on the trigger spaced inwardly from the first mentioned stops and acting to engage one of said fingers and control the time exposure operation of the master operating member, the fingers on the latter being engaged alternately by said stops on the trigger for effecting time and bulb exposures, and means engageable with the trigger for adjusting it to selected initial position.

5. In a photographic shutter, the combination with a master operating member that is operable to effect movement of the shutter for a time, bulb, or instantaneous exposure, and a setting lever operatively associated with the master operating member, a pair of fingers upon the master operating member, of a one-piece trigger provided with a series of integral controlling stops spaced from each other and arranged at equal distances from the point about which the trigger moves, said stops being selectively engageable with one of said fingers, a supplemental integral controlling stop spaced inwardly from the aforementioned stops, said fingers being engaged alternately by the first mentioned stops on the trigger, one of said fingers being engaged by said supplemental stop to limit movement of the master operating member upon one complete operation of the trigger and to release the master operating member for completion of its movement to effect a time exposure upon a second operation of the trigger, and means engageable with said trigger for adjusting it to select one of said controlling stops to retain the master operating member.

6. In a photographic shutter, the combination with a master operating member that is operable to effect movement of the shutter for a time, bulb, or instantaneous exposure, and a setting lever operatively associated with the master operating member, a pair of fingers carried by the master operating member and spaced from each other in the direction of movement of the master operating member, of a one-piece trigger provided with a series of integral controlling stops spaced from each other, said stops being selectively engageable with one of said fingers, and a supplemental integral controlling stop spaced inwardly from the first mentioned stops, said fingers being movable between said controlling stops on the trigger and alternately engageable therewith to effect the necessary partial movement of the master operating member for time or bulb exposure, and means engageable with said trigger for adjusting it to select one of said controlling stops to retain the master operating member.

7. In a photographic shutter, the combination with a master operating member that is operable to effect movement of the shutter for a time, bulb, or instantaneous exposure, and a setting lever operatively associated with the master operating member, fingers on the master operating member, of a one-piece trigger, a series of integral stops on said trigger selectively engageable with one of the fingers on the master operating member to permit either complete or limited movements of the latter for effecting a time, bulb, or instantaneous exposure depending upon the position of the trigger, the other of said fingers on the master operating member cooperating with one of the stops on the trigger during time or bulb exposures, and means engageable with the trigger for adjusting it to select a particular stop and retain the trigger in selected position.

8. In a photographic shutter, the combination with a master operating member that is operable to effect movement of the shutter for a time, bulb, or instantaneous exposure, fingers on the master operating member, of a one-piece trigger, a series of integral stops on said trigger engageable with one of the fingers on the master operating member to permit either complete or limited movements of the latter for effecting a time, bulb, or instantaneous exposure depending upon the position of the trigger, the other of said fingers on the master operating member cooperating with one of said stops during time or bulb exposures, and means engageable with the trigger for adjusting it to select a particular controlling means and retain it in position to engage a finger on the master operating member.

9. In a photographic shutter, the combination with a master operating member that is operable to effect movement of the shutter for a time, bulb, or instantaneous exposure, and a setting lever operatively associated with the master operating member, of a pivoted one-piece trigger, a series of spaced integral controlling stops arcuately arranged on the trigger, a plurality of fingers on the master operating member which are radially spaced and arcuately offset from each other with reference to the center of movement of the trigger and engageable alternately with said controlling stops on the trigger to permit either limited or complete movement of the master operating member for a time, bulb, or instantaneous exposure depending upon the position of the trigger, and a supplemental integral controlling stop on the trigger between the aforesaid stops and the center of movement of the trigger and in radial alinement with the space between two of the first mentioned stops to retain the master operating member after partial movement for a time exposure, and means engageable with the trigger for initially adjusting it to select one of the controlling stops and retain it in position for engaging the master operating member.

10. In a photographic shutter, the combination with a master operating member that is operable to effect movement of the shutter for a time, bulb, or instantaneous exposure, a plurality of fingers on the master operating member, of a one-piece trigger having a series of integral controlling stops selectively engageable with one of said fingers to retain the master operating member, said stops cooperating alternately with said fingers on the master operating member for permitting movement of the latter to permit either a time, bulb, or instantaneous exposure, means engaging the trigger for adjusting it initially to select one of said controlling stops for retaining a finger of the master operating member, retarding mechanism operatively associated with the master operating member during an instantaneous exposure, and a controlling cam operatively associated with the retarding mechanism and engaging said trigger, said cam being adjustable to change the retarding mechanism and thereby vary the time of an instantaneous exposure and also to adjust and retain the trigger in selected initial position.

11. In a photographic shutter, the combination with a master operating member that is operable to effect movement of the shutter for a time, bulb, or instantaneous exposure, a plurality of fingers on the master operating member, of a one-piece trigger provided with a series of integral controlling stops selectively engageable with one of said fingers on the master operating member, the other of said fingers on the master operating member cooperating with one of said stops during time or bulb exposures, retarding mechanism operatively connected with the master operating member during an instantaneous exposure, and an adjustable controlling cam operatively associated with the retarding mechanism and engaging said trigger, said cam including portions cooperating with the retarding mechanism and other portions cooperating with said trigger and acting when in one extreme position to position the trigger for a time exposure, when moved partially from such extreme position to position the trigger for a bulb exposure, and when moved further from said extreme position to position the trigger for an instantaneous exposure and effect positioning of the retarding mechanism for variously timed instantaneous exposures.

12. In a photographic shutter, the combination with a master operating member that is operable to effect movement of the shutter for a time, bulb, or instantaneous exposure, and a setting lever operatively associated with the master operating member, a pair of fingers on the master operating member, of a one-piece trigger, a series of integral controlling stops on said trigger selectively engageable with one of said fingers, the other of said fingers on the master operating member cooperating with one of said stops during time or bulb exposures, a projection on the trigger, and an adjustable controlling cam having an end surface which engages said projection to hold the trigger in position for time or bulb exposures and an arcuate surface that rides over said projection to position the trigger for instantaneous exposure, the cam being adjustable to move the trigger and initially select one of said controlling stops to retain the master operating member.

13. In a photographic shutter, the combination with a master operating member, of a retarding mechanism for governing the same comprising a gear train including an intermeshing pinion and gear segment, a gear mounted coaxially with said pinion and fixedly associated therewith, a pin carried on a side of said gear in spaced relation to said pinion, the aforementioned gear segment having a recess at one end thereof for engagement with said pin and acting to turn the gear on which the latter is mounted after the segment has disengaged the pinion and at a slower speed.

14. In a photographic shutter, the combination with a master operating member, of a retarding mechanism operatively associated therewith comprising a gear train, said gear train including a plurality of pairs of gear elements having different ratios, the gears of one pair being mounted fixedly and coaxially with the gears of the other pair, one of said pairs of gears being automatically engaged and the other of said pairs of gears being automatically disengaged at a predetermined point in the movement thereof to change their ratio so as to decrease the speed of the driven gear element for higher speeds and to increase it for lower speeds of instantaneous exposure automatically.

15. In a photographic shutter, the combination with a master operating member that is operable to effect movement of the shutter for a time, bulb, or instantaneous exposure, and a plurality of fingers on the master operating member, of a one-piece trigger having a series of integral controlling stops, the trigger being adjustable to position any one of said controlling stops to engage one of said fingers and retain the master operating member, the other of said fingers on the master operating member cooperating with a stop on the trigger during time or bulb exposures.

16. In a photographic shutter, the combination with a master operating member that is operable to effect movement of the shutter for a time, bulb, or instantaneous exposure, and a setting lever operatively associated therewith, a plurality of fingers on the master operating member, of a one-piece trigger having a series of integral controlling stops which are selectively engageable with one of said fingers on the master operating member to retain the latter and control its operation, the other of said fingers on the master operating member cooperating with a stop on the trigger during time or bulb exposures, and the trigger being adjustable to different positions to select the particular controlling stop.

17. In a photographic shutter, the combination with a base having a series of circularly arranged spaced upstanding bearing portions of reduced width, of an operating ring of thin light weight material mounted on said base for oscillating movement and guided by said bearing portions, said operating ring having a relatively wide upset portion located between its inner and outer edges affording narrow peripheral portions adjacent to said inner and outer edges resting on the base, and a series of shutter blades of thin light weight material operatively connected to said ring.

18. In a photographic shutter, the combination with a base having a central portion and an outer portion in different planes, of an operating ring of thin light weight material mounted for oscillating movement on said outer portion, said operating ring having a wide upset portion between its inner and outer edges affording narrow peripheral portions adjacent to said inner and outer edges resting on the base, and a series of shutter blades of thin light weight material mounted on said central portion of the base, the aforementioned upset portion of the ring having upset projections engaging openings in the blades.

19. In a photographic shutter, the combination with a base having a central portion and an outer portion in different planes, and a series of circularly arranged spaced upstanding bearing portions of reduced width at the edge of said central portion, an operating ring of thin light weight material mounted for oscillatory movement on said outer portion and guided by said bearing portions, said ring having a wide upset portion between its inner and outer edges affording narrow peripheral portions adjacent to said inner and outer edges resting on the base, and a series of shutter blades of thin light weight material mounted on said central portion of the base, said upset portion of the ring having upset projections engaging openings in the blades.

20. In a photographic shutter, the combination with a housing including bottom and side walls and a top wall secured thereto, mechanism within the housing including a controlling cam located against said top wall, of an adjusting ring movably arranged over said top wall and extending over its edge and the top of the side wall, the top wall having an opening, means extending through said opening connecting the controlling cam with said adjusting ring, the adjusting ring being recessed around its inner edge, and a cover plate having an inner portion abutting and secured to said top wall and an outer portion located in said recess of the adjusting ring and overlying the connection between the adjusting ring and said cam.

FRIEDRICH A. GUSTAV PIRWITZ.